United States Patent [19]
Turchi

[11] Patent Number: 5,835,545
[45] Date of Patent: Nov. 10, 1998

[54] COMPACT INTENSE RADIATION SYSTEM

[75] Inventor: Peter J. Turchi, Worthington, Ohio

[73] Assignee: The United States of America as represented by the Secretary of the Air Force, Washington, D.C.

[21] Appl. No.: 910,538

[22] Filed: Jul. 30, 1997

[51] Int. Cl.[6] ........................................... G21B 1/00
[52] U.S. Cl. .................... 376/145; 315/111.41; 307/419; 89/1.11
[58] Field of Search ..................... 376/145, 144, 376/148, 111, 108; 315/111.21, 111.31, 111.41, 111.81, 344; 313/230, 231.31; 307/419; 89/1.11

[56] References Cited

U.S. PATENT DOCUMENTS

| | | | |
|---|---|---|---|
| 3,693,002 | 9/1972 | Espy ..................................... | 313/231.31 |
| 3,705,304 | 12/1972 | Hopkinson et al. ..................... | 250/267 |
| 3,715,595 | 2/1973 | Josephson ................................ | 376/145 |
| 3,876,938 | 4/1975 | Ohta et al. ................................ | 367/87 |
| 3,963,948 | 6/1976 | Bratkowski et al. ...................... | 310/15 |
| 4,293,794 | 10/1981 | Kapetanakos ...................... | 315/111.41 |
| 4,630,274 | 12/1986 | Schafer ....................................... | 372/9 |
| 4,753,153 | 6/1988 | Jasper et al. ............................... | 310/12 |
| 4,912,731 | 3/1990 | Nardi ....................................... | 376/145 |
| 4,924,485 | 5/1990 | Hoeberling .............................. | 315/338 |
| 4,983,859 | 1/1991 | Nakajima et al. ....................... | 307/419 |
| 5,044,282 | 9/1991 | Fuchs et al. ............................. | 102/475 |
| 5,059,839 | 10/1991 | Rose et al. ................................ | 310/10 |
| 5,125,104 | 6/1992 | Ohkawa ................................... | 102/209 |
| 5,329,205 | 7/1994 | Goebel et al. ...................... | 315/111.21 |

*Primary Examiner*—Daniel D. Wasil
*Attorney, Agent, or Firm*—William G. Auton; Kenneth E. Callahan

[57] ABSTRACT

A compact source of intense radiation includes: a multi-element, disc-style, explosive magnetic flux compression generator, switching, peaking-stage generator, plasma flow switch, and a dense-plasma-focus type, pulsed neutron source. The main explosive generator receives initial amounts of magnetic flux and energy from a smaller explosive generator. Explosive action drives the conductors of the main generator together, reducing the inductance and thereby increasing both the current and magnetic energy. A switch closes to connect the peaking-stage generator and plasma flow switch in series with the main generator (and in parallel with the ballast inductor). As the current rises in the plasma flow switch, its plasma armature is electromagnetically-accelerated axially along coaxial electrodes, attaining speeds above 60–70 km/s. Meanwhile, explosive action on the peaking-stage generator provides additional magnetic flux compression. The arrangement makes use of the moderating influence of hydrogen-bearing products (from the explosive generators), that remain between the neutron source and the target during the neutron burst. The entire combination of explosive, electrical, plasmadynamic and neutronic action is designed to provide a compact source of intense electromagnetic radiation for accelerated protection against chemical and environmental weapons.

1 Claim, 1 Drawing Sheet

COMPACT INTENSE RADIATION SYSTEM

STATEMENT OF GOVERNMENT INTEREST

The invention described herein may be manufactured and used by or for the Government for governmental purposes without the payment of any royalty thereon.

BACKGROUND OF THE INVENTION

The present relates generally to magnetic flux compression generators, and more specifically the invention pertains to a compact source of intense electromagnetic radiation for accelerated protection against chemical and environmental dangers.

Conventional methods for radiation generation are not effective in providing protection against chemical and environmental weapons because their energy levels are low and they have not been designed for rapid delivery to sites where threats occur.

The task of providing a compact source of intense electromagnetic radiation for accelerated protection against chemical and environmental weapons is alleviated, to some extent by the systems disclosed in the following U.S. patents, the disclosures of which are incorporated herein by reference:

U.S. Pat. No. 4,753,153 issued to Jasper;
U.S. Pat. No. 4,983,859 issued to Nakajima;
U.S. Pat. No. 4,293,794 issued to Kapetanakos;
U.S. Pat. No. 3,963,948 issued to Bratkowski;
U.S. Pat. No. 3,876,938 issued to Ohta;
U.S. Pat. No. 5,125,104 issued to Ohkawa;
U.S. Pat. No. 4,630,274 issued to Schafer; and
U.S. Pat. No. 3,705,304 issued to Hopkinson.
U.S. Pat. No. 3,693,002 issued to Espy;
U.S. Pat. No. 5,044,282 issued to Fuchs; and
U.S. Pat. No. 5,329,205 issued to Goebelson.

The above cited patents disclose magnetic pulse generators, electromagnetic pulse generators, disc explosive pulse generators, plasma switch systems and neutron pulse generators that may be used as elements of the present invention. A need remains for a compact source of intense electromagnetic radiation for accelerated protection against chemical and environmental weapons. The present invention is intended to satisfy that need.

SUMMARY OF THE INVENTION

The present invention is a compact source of intense radiation and includes: a multi-element, disc-style, explosive magnetic flux compression generator, switching, peaking-stage generator, plasma flow switch, and a dense-plasma-focus type, pulsed neutron source.

The main explosive generator receives initial amounts of magnetic flux and energy from a smaller explosive generator. Explosive action drives the conductors of the main generator together, reducing the inductance and thereby increasing both the current and magnetic energy. The initial current path in the generator is closed through a series ("ballast") inductor with a value intermediate between the initial generator inductance and the initial inductance of the peaking-stage generator and the plasma flow switch.

A switch closes to connect the peaking-stage generator and plasma flow switch in series with the main generator (and in parallel with the ballast inductor). As the current rises in the plasma flow switch, its plasma armature is electromagnetically-accelerated axially along coaxial electrodes, attaining speeds above 60–70 km/s. Meanwhile, explosive action on the peaking-stage generator provides additional magnetic flux compression to help maintain a positive-rate-of-rise of current in the-plasma flow switch.

When the plasma flow switch armature sweeps off the end of the inner conductor of the coaxial electrode structure, current is initiated in a deuterium-tritium gas mixture injected from a reservoir in the endface of the inner conductor; (prior to this injection, the plasma flow switch has vacuum conditions on both sides of the annular plasma armature.)

Current flow through the deuterium-tritium gas is initially axial in the form of a cylindrical plasma discharge. Electromagnetic forces implode this plasma discharge, creating a relatively high density, high temperature column on the axis of the system. An intense burst of 14.1 MeV neutrons is generated in the high energy density plasma column, (often referred to as a dense-plasma-focus). To increase the neutron dose in target materials, the arrangement makes use of the moderating influence of hydrogen-bearing products (from the explosive generators), that remain between the neutron source and the target during the neutron burst. The entire combination of explosive, electrical, plasmadynamic and neutronic action is designed to fit within the volume, weight and diameter constraints of appropriate missile platforms.

It is an object of the present invention to provide a compact source of radiation for active defense against chemical and biological threats.

It is another object of the present invention to combine explosive, electrical plasmadynamic and neutronic actions to provide a compact source of radiation.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

Figure 1:
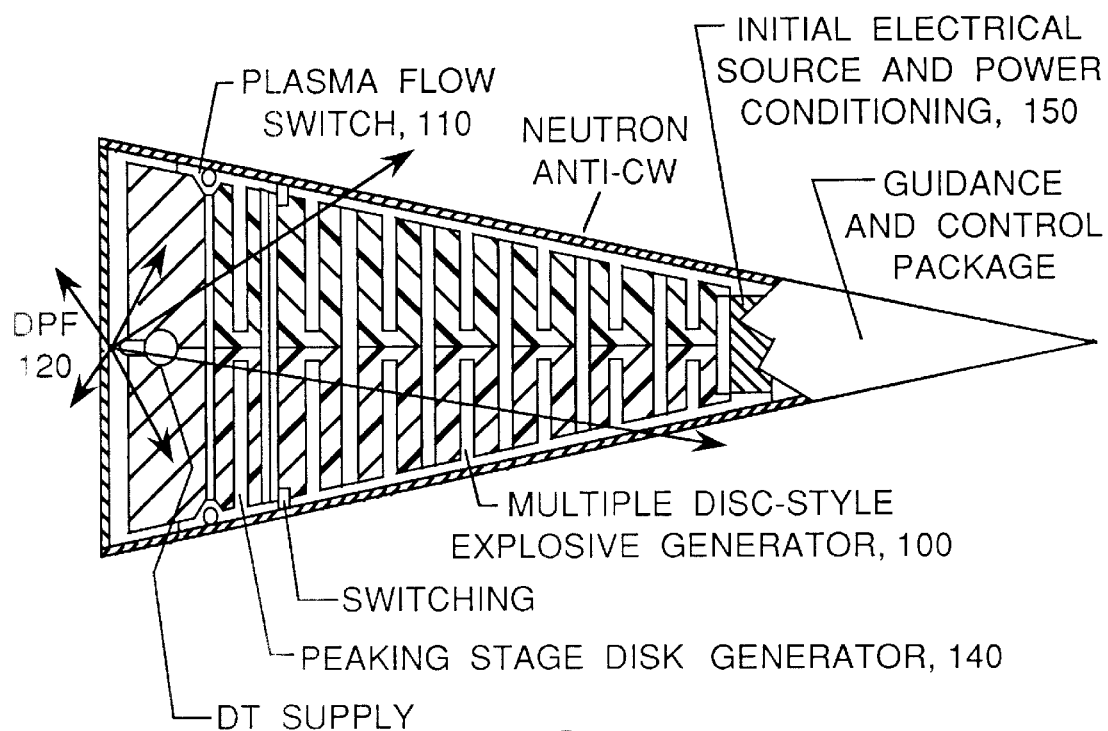
FIG. 1 is an illustration of the present invention.

The invention utilizes a combination of explosive, electrical, plasmadynamic and neutronic actions to provide a compact source of intense radiation in a system capable of being flown by a tactical missile. The arrangement is shown schematically in FIG. 1, and comprises a multi-element, disc-style, explosive magnetic flux compression generator 100, switching, peaking-stage generator 140, plasma flow switch 110, a dense plasma-focus type, pulsed neutron source 120 and a seed power supply 150.

MCG's also known as Flux Compression Generators, are usually explosively driven devices capable of generating tens of kilovolts at millions of amperes on a time scale of tens of microseconds. These performance figures are typical and particular designs may vary considerably from the numbers quoted. Other similar sources include capacitive energy storage banks. The simple generic consists of an inductor or coil through which a priming current is circulated by means of a low power source. The priming current establishes a seed magnetic field in the coil. A specially shaped explosive charge is arranged about the coil in such a manner as to compress the coil upon detonation. The seed flux is trapped in the coil and is thus compressed with the coil. The work done by the explosive in compressing the seed flux and the coil corresponds to a conversion of the explosive energy into electrical energy in the circuit.

Conventional techniques for generating fast-rising, high-voltage pulses generally involve high-voltage capacitors and a plurality of high-voltage, closing-switches in arrangements such as Marx generators. High voltages are also generated from lower voltage pulses by means of transformers. In this case, the output pulse generally follows the risetime and duration of the input pulse. The explosive disc generator and plasma switch technology used is state-of-the-art technology such as the above-cited patents.

The main explosive generator 100 receives initial amounts of magnetic flux and energy from a smaller explosive generator. Explosive action drives the conductors of the main generator together, reducing the inductance and thereby increasing both the current and magnetic energy. The initial current path in the generator is closed through a series ("ballast") inductor with a value intermediate between the initial generator inductance and the initial inductance of the peaking-stage generator and the plasma flow switch.

A switch closes to connect the peaking-stage generator 140 and plasma flow switch 110 in series with the main generator 100 (and in parallel with the ballast inductor). As the current rises in the plasma flow switch, its plasma armature is electromagnetically-accelerated axially along coaxial electrodes, attaining speeds above 60–70 km/s. Meanwhile, explosive action on the peaking-stage generator provides additional magnetic flux compression to help maintain a positive-rate-of-rise of current in the-plasma flow switch 110.

In one embodiment, when the plasma flow switch armature sweeps off the end of the inner conductor of the coaxial electrode structure, current is initiated in a deuterium-tritium gas mixture injected from a reservoir in the endface of the inner conductor; (prior to this injection, the plasma flow switch has vacuum conditions on both sides of the annular plasma armature.)

Current flow through the deuterium-tritium gas is initially axial in the form of a cylindrical plasma discharge. Electromagnetic forces implode this plasma discharge, creating a relatively high density, high temperature column on the axis of the system. An intense burst of 14.1 MeV neutrons is generated in the high energy density plasma column, (often referred to as a dense-plasma-focus). To increase the neutron dose in target materials, the arrangement makes use of the moderating influence of hydrogen-bearing products (from the explosive generators), that remain between the neutron source and the target during the neutron burst. The entire combination of explosive, electrical, plasmadynamic and neutronic action is designed to fit within the volume, weight and diameter constraints of appropriate missile platforms.

Figure 2:
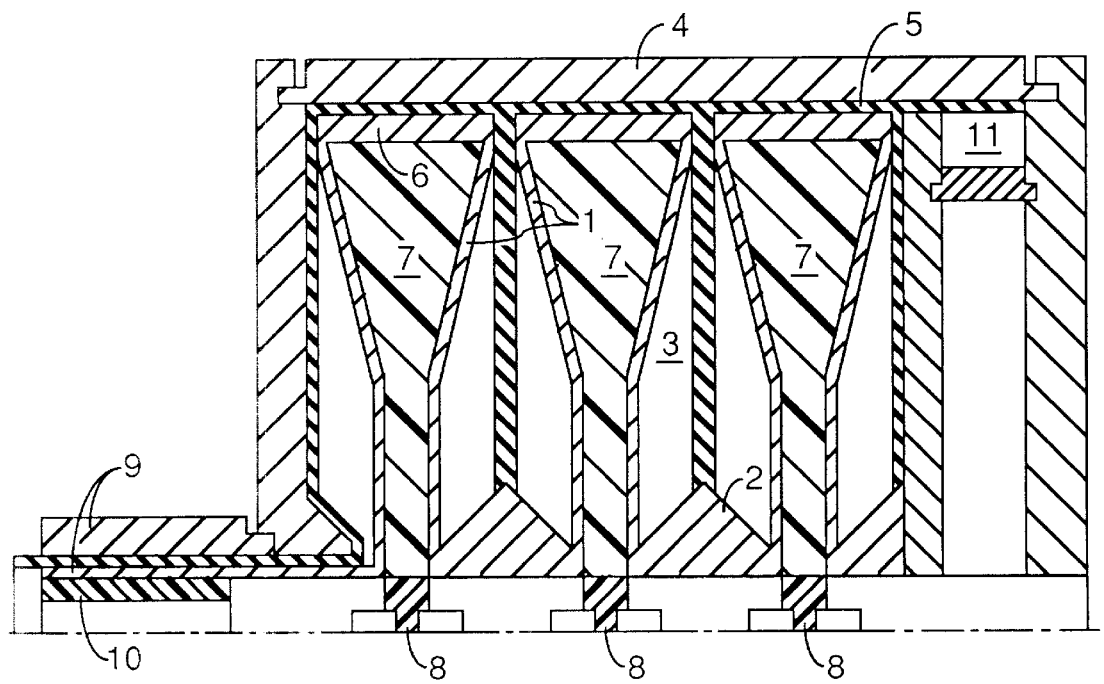
FIG. 2 is an illustration of a prior art three module explosive magnetic generator useable in the present invention.

FIG. 2 is an illustration of a prior art three module explosive magnetic generator useable in the present invention. It includes a set of plates 1, joints 2, an implosion cavity 3, a tube 4, a dielectric 5, an envelope 6, high explosive 7, initiation points 8, a coaxial unit 9, a cylindrical charge 10, and an inductive load 11. The system of FIG. 2 is in use to provide the symmetric implosion of an azimuthal magnetic field as a source of electromagnetic energy.

Alternative versions include use of appropriate materials between the neutron source and the target to provide gamma rays from so-called n-gamma reactions, and the use of a coaxial-plate style explosive flux compression generator instead of the disc style arrangement for the peaking-stage generator shown in FIG. 1.

The invention can be used as a specialized active defense against chemical and biological weapons.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A method for producing an intense compact source of high-energy neutrons, the method comprising:

a. supplying initial amounts of magnetic flux and energy to a main explosive generator using a small explosive generator;

b. providing a main multi-element, disc-style, explosive magnetic flux compression generator (100) to receive the initial amounts of magnetic flux and energy from said small explosive generator, causing the conductors of the main generator to be driven together, reducing the inductance and thereby increasing both the current and magnetic energy;

c. closing the initial current path in the main generator through a series ballast inductor with a value intermediate between the initial explosive generator inductance and the initial inductance of a peaking-stage generator (140) and a plasma flow switch (110);

d. closing a switch to connect the peaking-stage generator (140) and plasma flow switch (110) in series with the main generator (100) and in parallel with the series ballast inductor, whereby as current rises in the plasma flow switch, its plasma armature is electromagnetically acccelerated axially along coaxial electrodes, while at the same time explosive action on the peaking-stage generator provides additional magnetic flux compression to help maintain a positive rate of rise of current in the plasma flow switch; and e. injecting a deuterium-tritium gas mixture when the plasma flow switch armature sweeps off the end of the inner conductor of the coaxial electrode structure, thereby initially causing current to flow through the gas mixture in the form of a cylindrical plasma discharge, whereby electromagnetic forces implode said plasma discharge generating an intense burst of 14.1 Mev neutrons.

* * * * *